United States Patent
Yin et al.

(10) Patent No.: US 11,228,368 B1
(45) Date of Patent: Jan. 18, 2022

(54) CHARACTERIZATION OF INTER-CHANNEL CROSSTALK IN AN OPTICAL NETWORK

(71) Applicant: MICROSOFT TECHNOLOGY LICENSING, LLC, Redmond, WA (US)

(72) Inventors: Yawei Yin, Redmond, WA (US); Binbin Guan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/098,192

(22) Filed: Nov. 13, 2020

Related U.S. Application Data

(60) Provisional application No. 63/074,450, filed on Sep. 3, 2020.

(51) Int. Cl.
*H04B 10/079* (2013.01)

(52) U.S. Cl.
CPC .............................. *H04B 10/07953* (2013.01)

(58) Field of Classification Search
CPC ............................................. H04B 10/07953
See application file for complete search history.

(56) References Cited

U.S. PATENT DOCUMENTS

| | | | | |
|---|---|---|---|---|
| 5,748,124 A * | 5/1998 | Rosenthal | .......... | G01R 31/3167 341/120 |
| 6,985,534 B1 * | 1/2006 | Meister | .............. | H04L 5/0007 375/260 |
| 7,912,667 B2 * | 3/2011 | Dworski | ............. | H03M 1/1095 702/117 |
| 2003/0086486 A1 * | 5/2003 | Graziano | ........... | H04L 25/4975 375/222 |
| 2011/0110657 A1 * | 5/2011 | Feuer | .............. | H04B 10/07953 398/26 |
| 2015/0010299 A1 * | 1/2015 | Wei | .................... | H04B 10/0775 398/26 |
| 2015/0304025 A1 * | 10/2015 | Liu | .................... | H04B 10/0795 398/28 |
| 2017/0264363 A1 * | 9/2017 | Gong | ................. | H04Q 11/0062 |
| 2018/0337727 A1 * | 11/2018 | Yoshida | ................. | H04J 14/08 |
| 2018/0375706 A1 * | 12/2018 | Pesin | .................. | H04L 27/2647 |
| 2021/0011141 A1 * | 1/2021 | Kotake | .................. | G01S 17/58 |

* cited by examiner

*Primary Examiner* — Tanya T Motsinger

(74) *Attorney, Agent, or Firm* — Newport IP, LLC; Han Gim

(57) ABSTRACT

An optical communications network comprises optical data links comprising data channels. A time-domain sampled waveform of a selected data channel is obtained. The Fourier transform is applied to the time-domain sampled waveform of the selected data channel to generate a frequency-domain waveform of the selected data channel. Time-domain sampled waveforms of the selected data channel's neighboring data channels are obtained. The Fourier transform is applied to the time-domain sampled waveforms of the neighboring data channels to generate frequency-domain waveforms of the neighboring data channels. The noise-to-signal ratio is calculated based on the frequency-domain waveforms. Based on the calculated noise-to-signal ratio, an optical signal to noise ratio (OSNR) penalty is estimated. A notification is generated when the OSNR penalty exceeds a predetermined threshold.

20 Claims, 8 Drawing Sheets

CHARACTERIZATION OF INTER-CHANNEL CROSSTALK IN AN OPTICAL NETWORK

CROSS-REFERENCE TO RELATED APPLICATION

This application claims priority to U.S. Provisional Application Ser. No. 63/074,450, entitled "CHARACTERIZATION OF INTER-CHANNEL CROSSTALK IN AN OPTICAL NETWORK," filed Sep. 3, 2020, which is incorporated herein.

BACKGROUND

A data center is a facility that houses computer systems and various networking, storage, and other related components. Data centers may, for example, provide computing services to businesses and individuals as a remote computing service or provide "software as a service" (e.g., cloud computing). A data center may utilize fiber optic networks within a data center, between data centers, and to communicate with other networks. Fiber optic networks typically carry data on multiple channels for multiple end-to-end links.

It is important to prevent downtime due to hardware, software, and network failures and other issues that may prevent the operation of services provided by the data center. When a data center experiences connectivity or data transmission issues, loss of data and services may occur, preventing users from providing quality services to their downstream customers, which may result in lost revenue and customer dissatisfaction. Production loss and inefficiencies with respect to computing resources can be exacerbated when the data center is unable to quickly isolate and correct the cause of a data transmission problem.

It is with respect to these considerations and others that the disclosure made herein is presented.

SUMMARY

The disclosed embodiments describe technologies for providing health monitoring and fault detection in optical networks. Optical networks can form a significant part of a data distribution network. Optical networks typically have a number of nodes, such as optical line terminal nodes, reconfigurable optical add-drop multiplexers (ROADM), and optical line amplifiers. Furthermore, optical networks may allocate spectrum for a shared transmission medium resource between multiple users, such as in a long-haul optical network, and may dynamically allocate the available transmission channels at multiple points along the network. In the case of an elastic optical network, it is common to achieve flexibility by defining small spectrum granularity and assigning an integer number of slots to the requests. However, as the granularity of bandwidth allocation becomes finer, issues such as crosstalk may arise. Crosstalk issues may arise due to a number of issues such as an optical filter or demultiplexer that imperfectly rejects neighboring channels around a target channel, or an optical switch with imperfect isolation among different wavelength ports.

The present disclosure describes techniques for analysis and maintenance of optical networks, in particular high-resolution spectral analysis for end-to-end inter-channel crosstalk measurement. Various embodiments describe ways to analyze signal data after optical-electrical conversion which allows for real-time characterization of a link's signal qualities by detecting when crosstalk noise has reached a threshold level and enabling calibration of the network. This may be performed by measuring time-domain sampled waveforms after optical-electrical conversion for a target channel and its neighboring channels, measuring the crosstalk waveform, calculating the optical signal to noise ratio, and comparing to the weighted crosstalk.

In some embodiments, the analysis may be performed with measurement data provided by various types of measurement equipment from signal measurements that has already been converted to electrical signals. Furthermore, the analysis and crosstalk detection can be performed in near real-time, allowing for a fast response to network issues as they arise. Furthermore, the disclosed techniques may allow for analysis in high resolution (e.g., lower than 1 GHz). The described techniques may also be performed without modification to existing network hardware. The techniques can be performed using sampled data provided by tapping an output of a digital signal processing (DSP) system, for example. The analysis and detection can be performed using automated systems, and in some embodiments can be performed using machine learning techniques.

By providing crosstalk characterization and detection in near real-time, the potential degradation or loss of data channels and expensive efforts to recover the degraded or lost channels may be avoided. Furthermore, by providing the characterization and detection without extensive modification to the network, the higher costs of duplicating or re-engineering the physical network can be avoided. Maintaining the availability and integrity of data channels is crucial for managing optical networks, and the described techniques can enable a cost-effective way to achieve such objectives.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The disclosed embodiments describe technologies for the analysis and maintenance of optical networks, in particular high-resolution spectral analyses for end-to-end inter-channel crosstalk measurement. Crosstalk is a significant issue that can limit transmission distance in optical networks. Crosstalk can be caused, for example, by inter-channel crosstalk from neighboring channels.

The disclosure provides a way to analyze signal data after optical-electrical conversion which allows for real-time characterization of a link's signal qualities by detecting when crosstalk noise has reached a threshold level and enabling calibration of the network. Analysis and detection may be performed by measuring time-domain sampled waveforms after optical-electrical conversion for a target channel and its neighboring channels, measuring the crosstalk waveform, measuring the noise to signal ratio, and comparing to the weighted crosstalk.

While there are a number of ways to characterize a line system, most are module-dependent or based on a particular module design. Typically, there is no direct way from the end-user perspective to directly characterize the system in the field or in the lab. The disclosed embodiments provide an effective way to perform end-to-end characterization of inter-channel crosstalk (optical and digital aliasing).

The disclosed embodiments also provide high resolution optical spectrum analysis. The disclosed embodiments may be performed in a manner that is integrated in each output receiver, thus avoiding the need to add additional hardware or components in the line system (e.g., a photodetector). The techniques may be performed using data provided by existing DSP-embedded systems. The techniques may further enable detection of other features in the field, such as carrier leakage, spectrum drift, or a fiber-cut event with AI monitoring.

Figure 1:
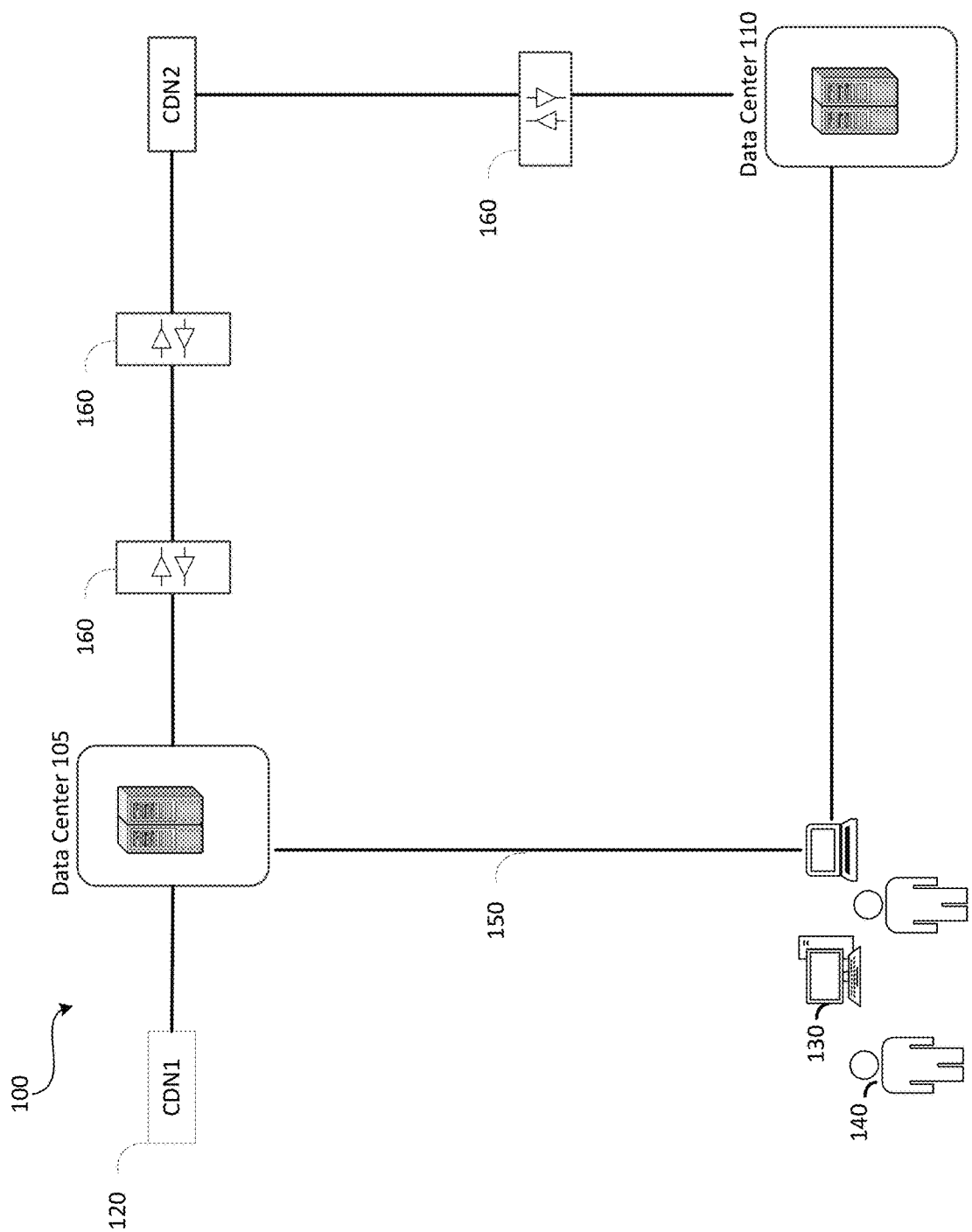
FIG. 1 is a diagram illustrating an example data center environment in accordance with the present disclosure.

FIG. 1 illustrates an example environment 100 in which embodiments of the disclosure may be implemented. Data centers 105 and 110 may be connected by a fiber optic network 150, and may provide computing resources to users 140 (which may be referred herein singularly as "a user 140" or in the plural as "the users 140") accessing the computing resources using client computers 130 (which may be referred herein singularly as "a computer 130" or in the plural as "the computers 130"). The computing resources provided by the data centers 105 and 110 may include various types of resources, such as computing resources, data storage resources, data communication resources, and the like. Data centers 105 and 110 may further allow distribution networks 120 to provide access to computing resources. Depending on physical distances, in some embodiments, amplifiers 160 may be installed at various points in the network as optical repeaters.

Figure 2:
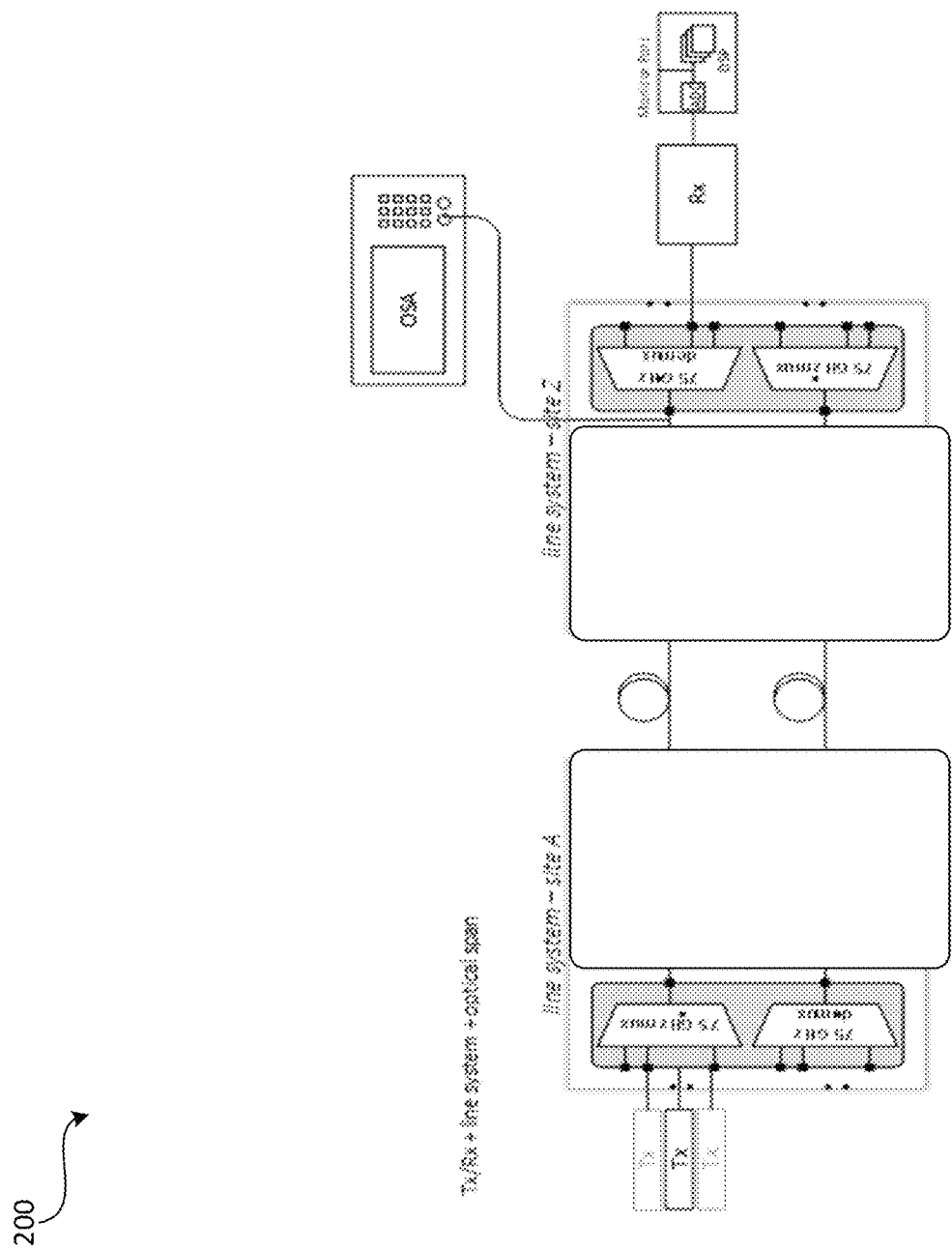
FIG. 2 is an example measurement environment in accordance with the present disclosure.

FIG. 2 illustrates additional details in an example environment 200 in which embodiments of the disclosure may be implemented. In the illustrated example, the time domain samples may be accessed via a port.

In an embodiment, a high-resolution optical system analysis for end-to-end inter-channel crosstalk measurement may comprise a calibration of the measurement system, and may comprise one or more of the following operations.

1. In an embodiment, homodyne detection may be configured so that the same wavelength is set up for the transmitter and receiver for the target channel. This may provide simpler measurement without drift.

2. In an embodiment, the measured time-domain sampled waveform e(t) may be obtained after analog-to-digital (ADC) sampling. In one embodiment, a minimum of 512 samples may be obtained. More samples may be used if available and depending on the memory capacity of the measurement system.

3. In an embodiment, the Fourier transform may be applied to the sampled waveform e(t) to obtain the signal waveform S(f) in the frequency domain.

4. In an embodiment, the scale factor k may be used for estimating transmission penalties from crosstalk. The scale factor k may be calculated based on the assumption that the crosstalk waveform is the same as that for the target channel s(f). In this case, the waveform overlap integral should be equal to 1, and k can be retrieved from the crosstalk waveform equation.

The scaling factor k is defined such that calculating the weighted crosstalk is the same as the standard crosstalk for the case when the primary signal S(f) and interfering signal X(f) have the same attributes. The weighting function may be related to the spectral shape of the primary signal and may be defined as $W(f)=k \cdot S(f)$. The weighted crosstalk value may be computed by multiplying the shaped interfering signal by the power spectral density of the primary signal. This value may be used to predict OSNR penalties in networks.

5. In an embodiment, two neighbor channels (left and right) may be set up that are 75 GHz away from the target channel. The OSNR penalty may be measured at the pre-FEC (pre-forward error correction) BER (bit error rate) threshold. The OSNR penalty is referenced to the single channel OSNR value at pre-FEC BER threshold. In one embodiment, the BER threshold is 1.25E-2.

6. In an embodiment, the target channel may be turned off, and the unweighted crosstalk X(f) can be measured.

7. In an embodiment, steps 5 and 6 may be repeated with different channel spacing from 75 GHz to 65 GHz. The OSNR penalty and crosstalk waveform X(f) may be recorded.

The OSNR penalty vs. weighted crosstalk measurement may be plotted. Weighted crosstalk (Noise to Signal Ratio) may be calculated based on the waveform overlap integral between the crosstalk waveform and the target channel waveform and scaled with the k factor.

Figure 3:
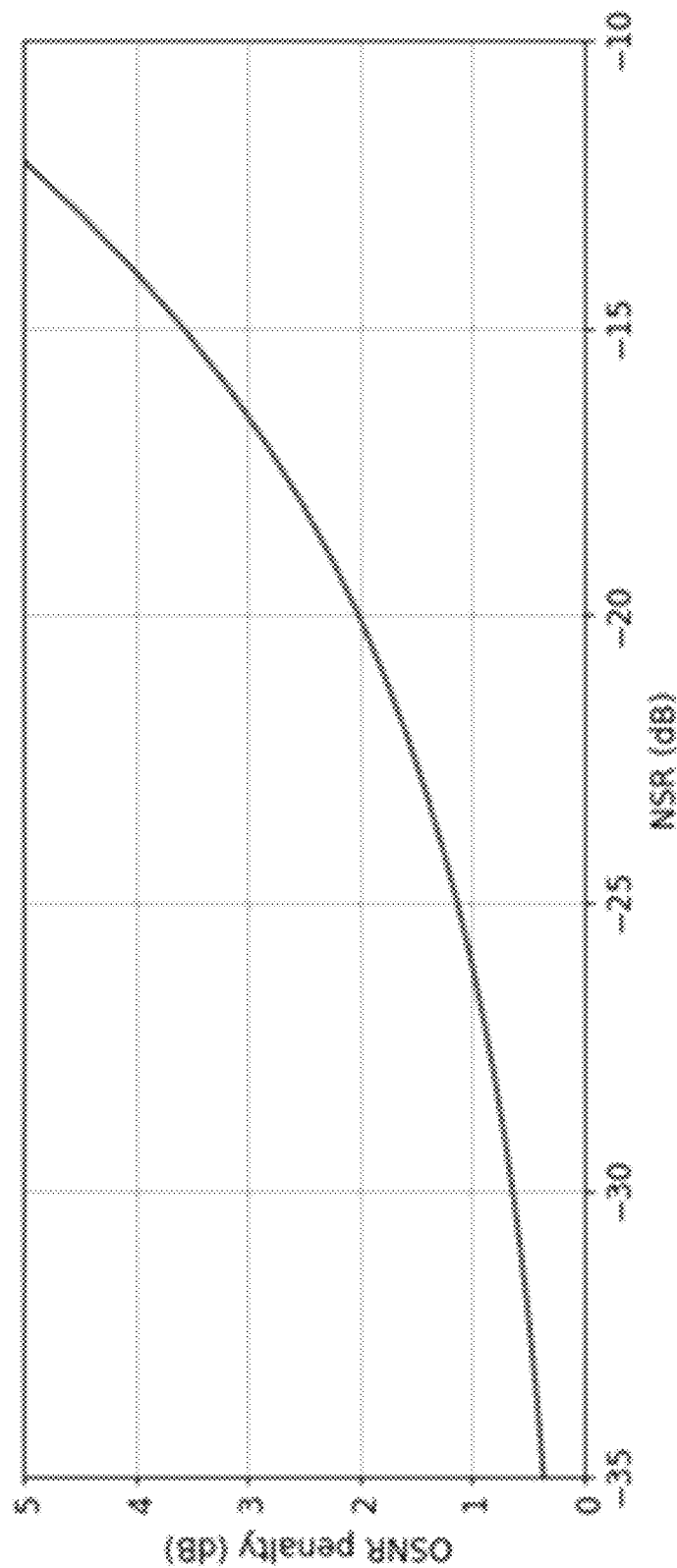
FIG. 3 is an example diagram of OSNR penalty vs. NSR in accordance with the present disclosure.

An example estimated OSNR penalty vs. weighted crosstalk plot is illustrated in FIG. 3.

In an embodiment, in-field measurement for end-to-end inter-channel and digital crosstalk may be performed and may comprise one or more of the following operations.

1. Neighboring channels (left and right) may be turned off, and the time-domain sampled waveform e(t) may be obtained after ADC sampling. In one embodiment, a minimum of 512 samples may be obtained. More samples may be used if available and depending on the memory capacity of the measurement system.

2. In an embodiment, the Fourier transform may be applied to the sampled waveform e(t) to obtain the signal waveform S(f) in the frequency domain.

3. In embodiment, the target channel may be turned off, and steps 1-2 may be repeated to measure the crosstalk waveform X(f). The NSR may be calculated.

4. Based on the calibration procedure, the OSNR penalty can be estimated in the real field if needed.

In an embodiment, in-field measurement for end-to-end spectrum may be performed and may comprise one or more of the following operations:

Steps 1-2 may be repeated without turning off the neighboring channels. The high-resolution spectrum can be measured in-field without impacting data traffic. The spectrum resolution can be smaller than 150 MHz.

Figure 4:
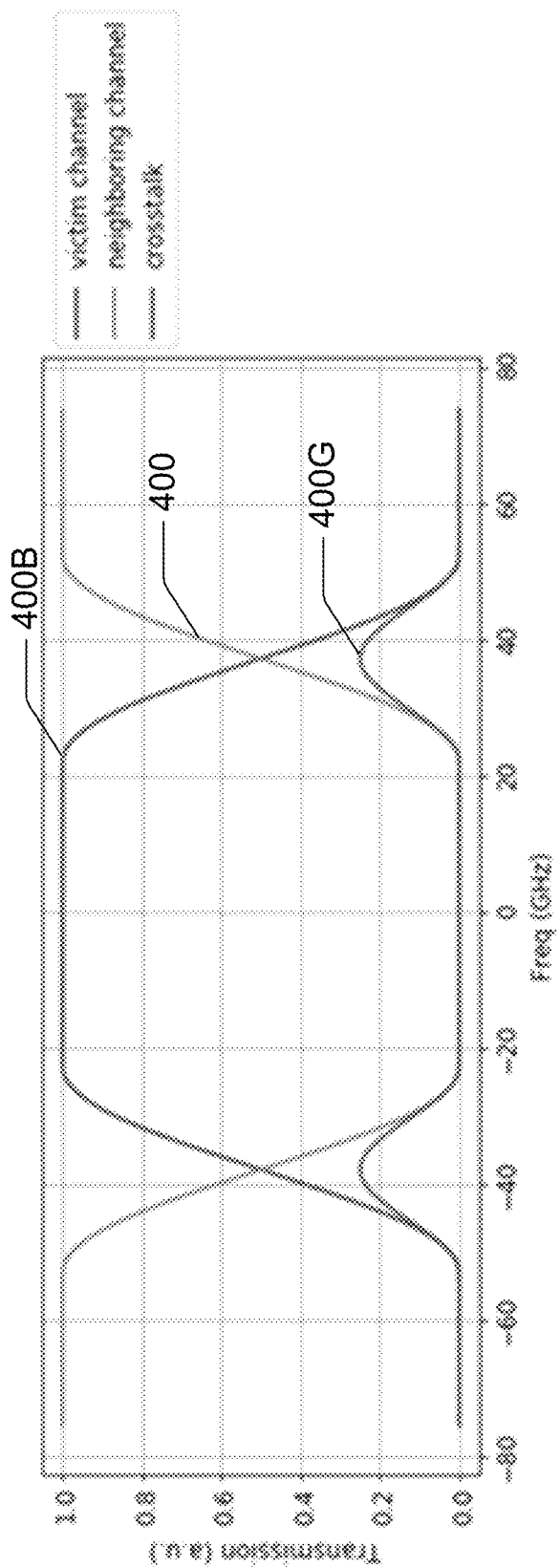
FIG. 4 is an example diagram showing crosstalk in accordance with the present disclosure.

FIG. 4 illustrates an example of the simulated spectrum (blue line/victim or target channel 400B), neighboring spectrum (orange line/neighboring channel 400), and crosstalk (green line/cross-talk 400G) (target channel may be referred to as victim channel).

It should also be appreciated that the examples described above are merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing or networking device may comprise any combination of hardware or software that can interact and perform the described types of functionality, including without limitation desktop or other computers, database servers, network storage devices and other network devices, tablets, intermediate networking devices, and various other devices that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 5:
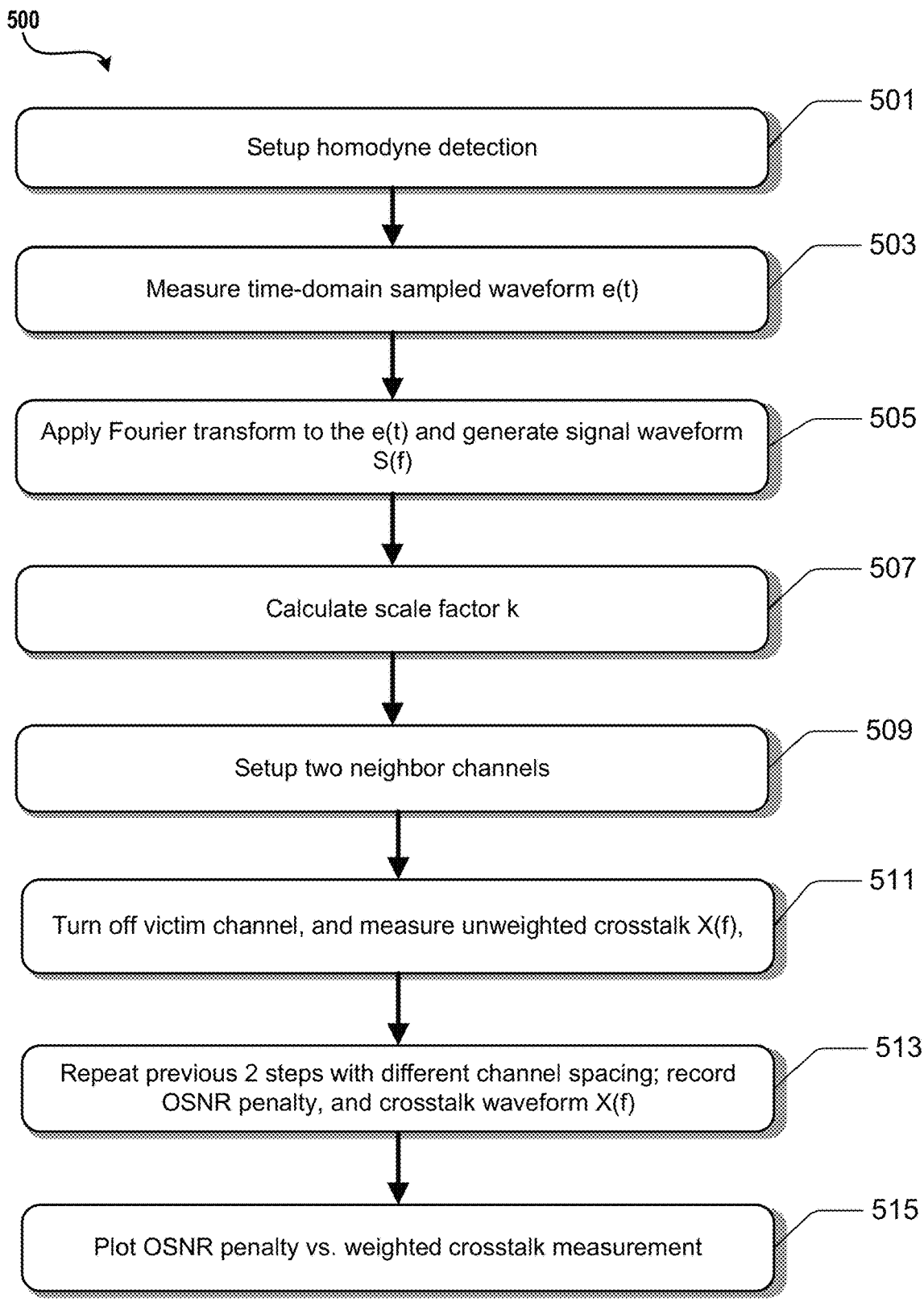
FIG. 5 is a flowchart depicting an example procedure in accordance with the present disclosure.

Turning now to FIG. 5, illustrated is an example flowchart for calibration in accordance with the present disclosure. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein and can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

The operations in FIG. 5 can be performed, for example, by a device configured to communicatively couple to an optical communications network. The optical communications network may include an optical transmission medium configured to transmit data signals on a plurality of optical signals carried on a plurality of optical wavelengths. The optical communications network may further comprise a plurality of optical data links interconnected by a plurality of switching nodes, the optical data links comprising a plurality of data channels, as described above with respect to any one of FIGS. 1-4.

Operation 501 illustrates setting up homodyne detection for the target channel. Operation 501 may be followed by operation 503. Operation 503 illustrates measure the time-domain sampled waveform e(t) after ADC sampling. In an embodiment, a minimum of 512 samples may be received. Operation 503 may be followed by operation 505. Operation 505 illustrates applying the Fourier transform to e(t) and generating signal waveform S(f) in the frequency domain. Operation 505 may be followed by operation 507. Operation 507 illustrates calculating scale factor k. In an embodiment, the scale factor k may be calculated based on the assumption that the crosstalk waveform is the same as that for the target channel s(J. In this case, the waveform overlap integral should be equal to 1, and k can be retrieved from the crosstalk waveform equation.

Operation 507 may be followed by operation 509. Operation 509 illustrates setting up two neighbor channels (left and right) 75 GHz away from the target channel. The OSNR penalty may be measured at the pre-FEC BER threshold. The OSNR penalty may be referenced to the single channel OSNR value at the pre-FEC BER threshold.

Operation 509 may be followed by operation 511. Operation 511 illustrates turning off the target channel and measuring the unweighted crosstalk X(f). The procedure may be the same as operations 501 and 503.

Operation 511 may be followed by operation 513. Operation 513 illustrates repeating operations 509 and 511 with different channel spacing. In an embodiment, the different channel spacing may be from 75 GHz to 65 GHz. The OSNR penalty and crosstalk waveform X(f) may be recorded.

Operation 513 may be followed by operation 515. Operation 515 illustrates plotting the OSNR penalty vs. weighted crosstalk measurements. The weighted crosstalk (Noise to Signal Ratio) may be calculated based on the waveform overlap integral between the crosstalk waveform and the target channel waveform and scaled with the k factor.

Figure 6:
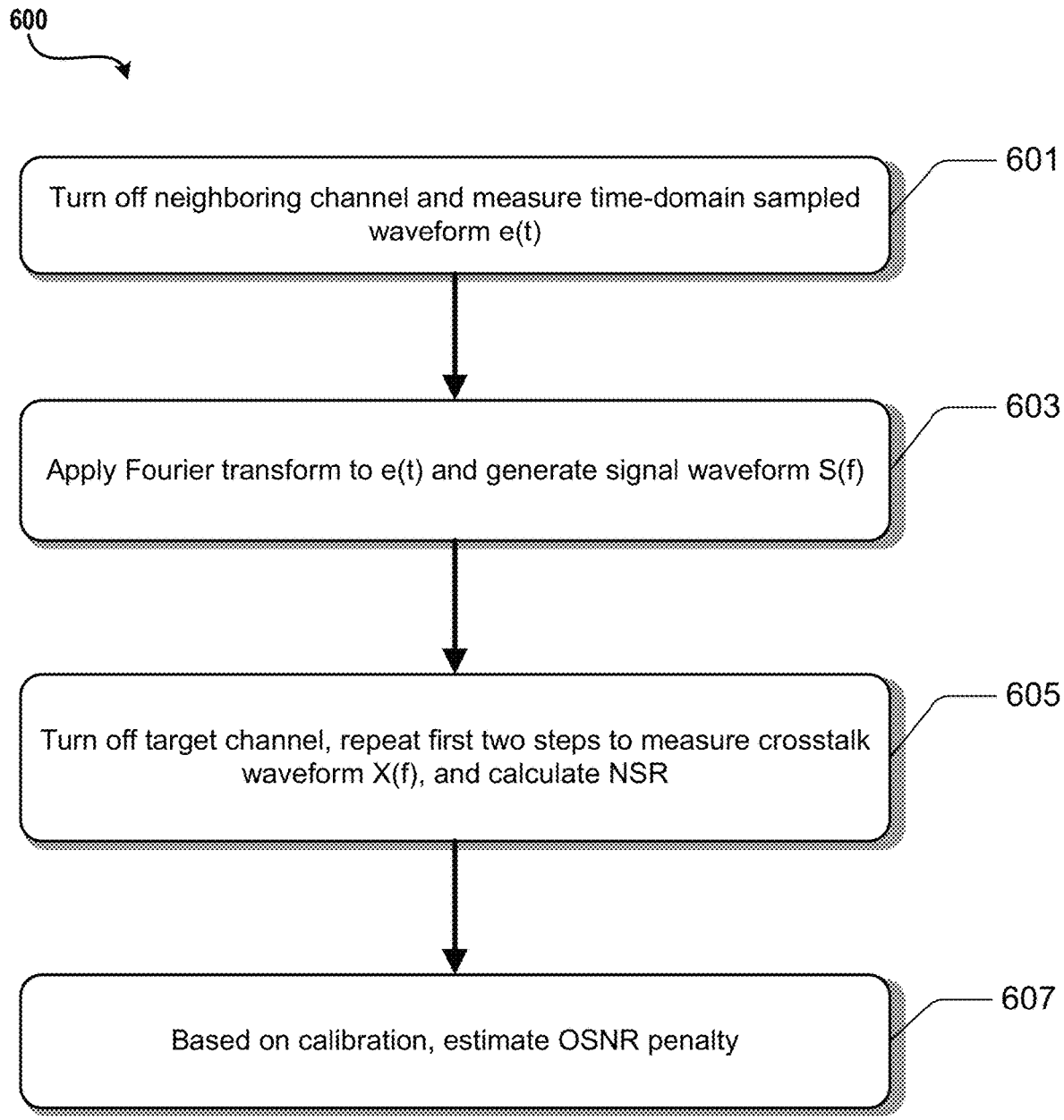
FIG. 6 is a flowchart depicting an example procedure in accordance with the present disclosure.

Turning now to FIG. 6, illustrated is an example operational procedure for implementing an optical communications network in accordance with the present disclosure. The operational procedure may be implemented in a system comprising a plurality of optical data links interconnected by a plurality of optical add-drop nodes and comprising a plurality of data channels. Referring to FIG. 6, operation 601 illustrates turning off neighboring channels (left and right) and obtaining the time-domain sampled waveform e(t) after ADC sampling. In one embodiment, a minimum of 512 samples may be obtained. More samples may be used if available and depending on the memory capacity of the measurement system.

Operation 601 may be followed by operation 603. Operation 603 illustrates applying the Fourier transform to the sampled waveform e(t) and generating the signal waveform S(f) in the frequency domain.

Operation 603 may be followed by operation 605. Operation 605 illustrates the turning off the target channel, and repeating operations 601 and 603 to measure the crosstalk waveform X(f). The NSR may be calculated.

Operation 605 may be followed by operation 607. Operation 607 illustrates based on a calibration routine, estimating the OSNR penalty in the field.

Figure 7:
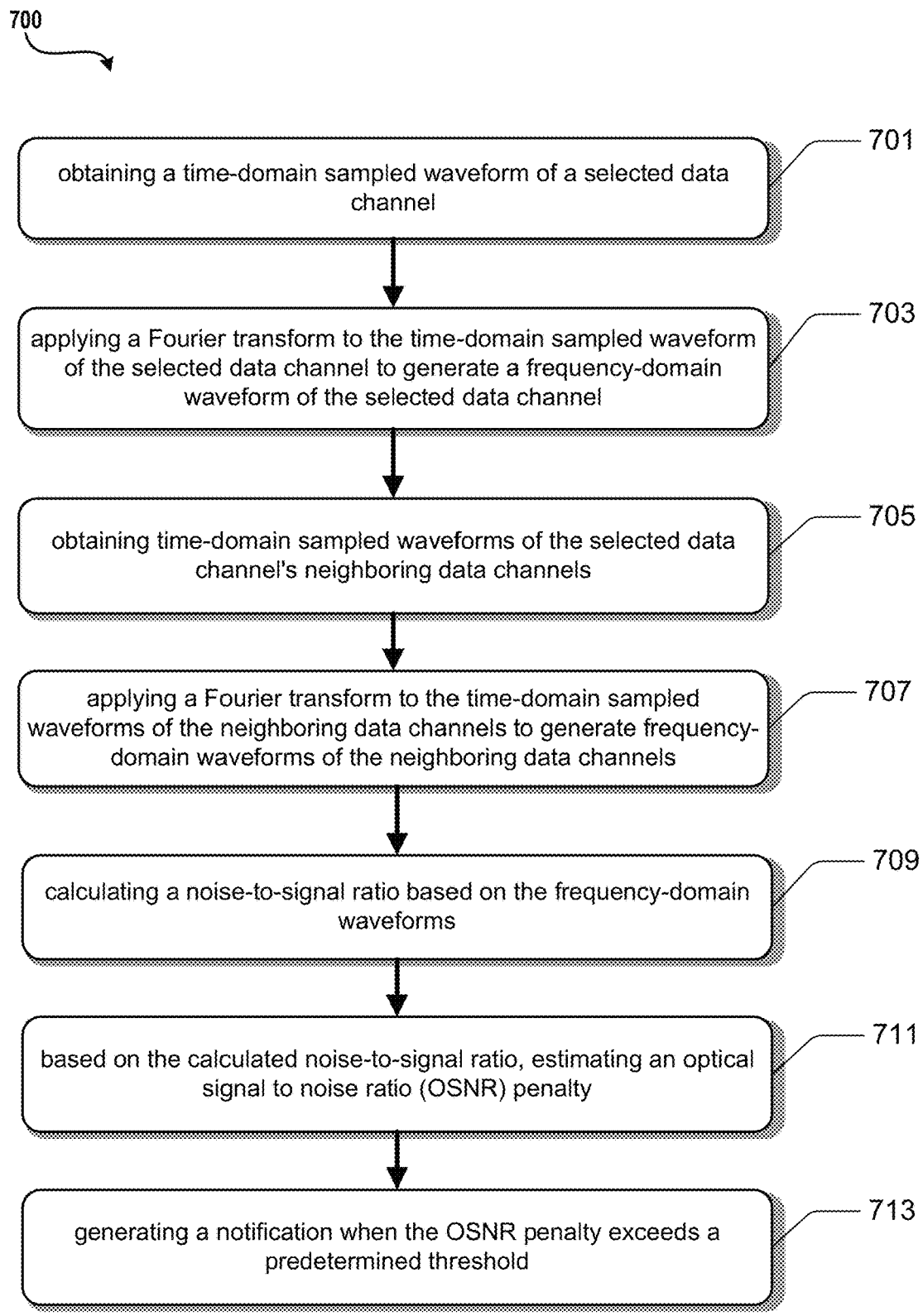
FIG. 7 is a flowchart depicting an example procedure in accordance with the present disclosure.

Turning now to FIG. 7, illustrated is an example operational procedure for implementing an optical communications network in accordance with the present disclosure. The operational procedure may be implemented in a system comprising a plurality of optical data links interconnected by a plurality of optical add-drop nodes and comprising a plurality of data channels. Referring to FIG. 7, operation 701 illustrates obtaining a time-domain sampled waveform of a selected data channel.

Operation 701 may be followed by operation 703. Operation 703 illustrates applying a Fourier transform to the time-domain sampled waveform of the selected data channel to generate a frequency-domain waveform of the selected data channel.

Operation 703 may be followed by operation 705. Operation 705 illustrates obtaining time-domain sampled waveforms of neighboring data channels of the selected data channel.

Operation 705 may be followed by operation 707. Operation 707 illustrates applying a Fourier transform to the time-domain sampled waveforms of the neighboring data channels of the selected data channel to generate frequency-domain waveforms of the neighboring data channels of the selected data channel.

Operation 707 may be followed by operation 709. Operation 709 illustrates calculating a noise-to-signal ratio based on the frequency-domain waveforms of the selected data channel and the neighboring data channels of the selected data channel.

Operation 709 may be followed by operation 711. Operation 711 illustrates based on the calculated noise-to-signal ratio, estimating an optical signal to noise ratio (OSNR) penalty.

Operation 711 may be followed by operation 713. Operation 713 illustrates generating a notification of a potential cross-talk issue when the OSNR penalty exceeds a predetermined threshold.

In an embodiment, homodyne detection is configured to set up a same wavelength for a transmitter and receiver for the selected channel.

In an embodiment, the time-domain sampled waveforms are generated after analog-to-digital (ADC) sampling of optical signals in the optical communications network.

In an embodiment, the OSNR penalty is determined based on a scale factor k that is calculated based on a crosstalk waveform equation.

In an embodiment, the OSNR penalty is determined based on a weighted crosstalk value that is determined by multiplying an interfering signal by a power spectral density of a primary signal.

In an embodiment, the OSNR penalty is determined at a pre-forward error correction (pre-FEC) bit error rate (BER) threshold.

In an embodiment, the pre-FEC BER threshold is 1.25E-2.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 8:
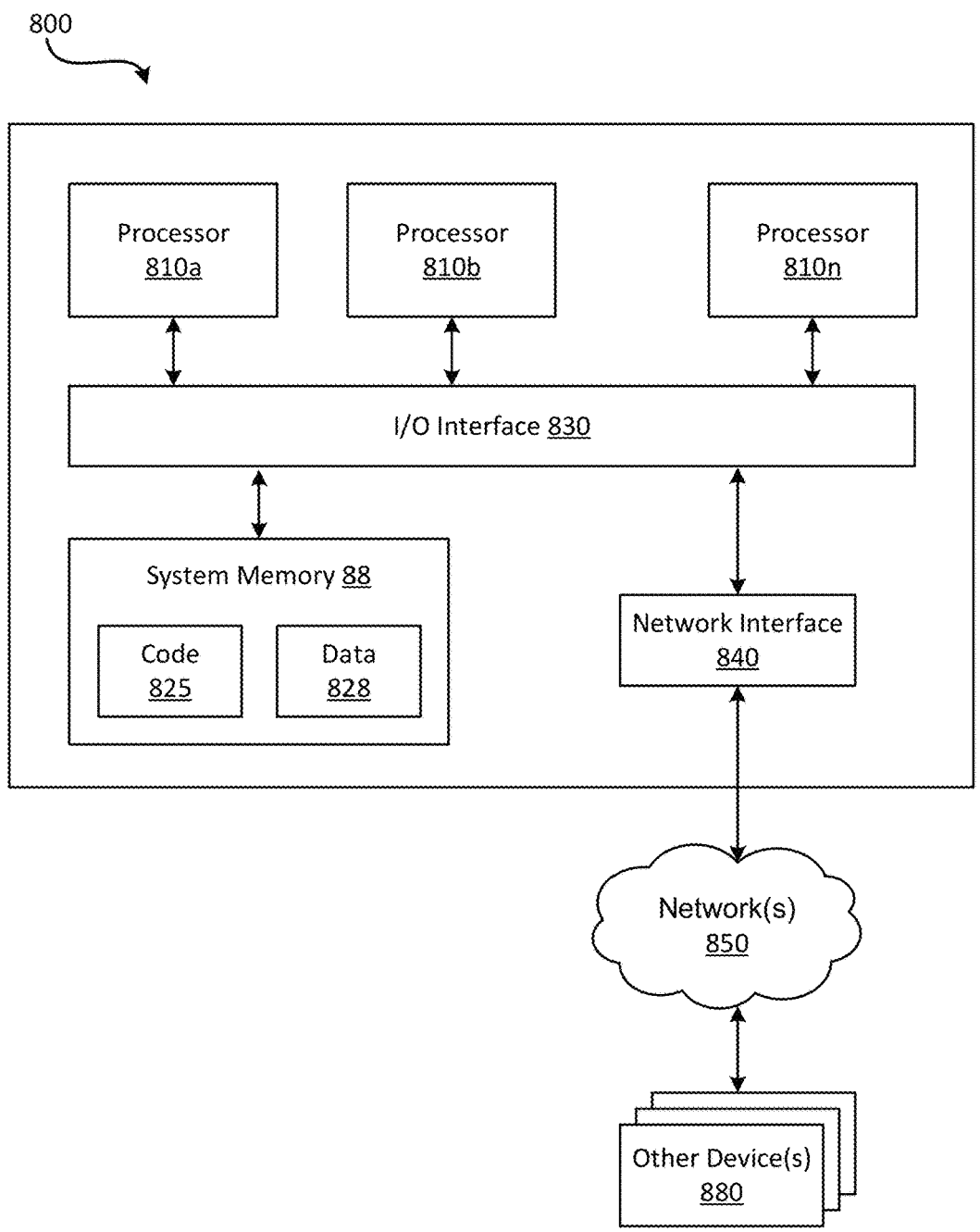
FIG. 8 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 8 illustrates such a general-purpose computing device 800. In the illustrated embodiment, computing device 800 includes one or more processors 810*a*, 810*b*, and/or 810*n* (which may be referred to herein singularly as "a processor 810" or in the plural as "the processors 810") coupled to a system memory 88 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the ×88, PowerPC, SPARC, or MIPS ISAs, or any other suitable ISA. In multiprocessor systems, each of processors 810 may commonly, but not necessarily, implement the same ISA.

System memory 88 may be configured to store instructions and data accessible by processor(s) 810. In various embodiments, system memory 88 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 88 as code 825 and data 828.

In one embodiment, I/O interface 830 may be configured to coordinate I/O traffic between the processor 810, system memory 88, and any peripheral devices in the device, including network interface 840 or other peripheral interfaces. In some embodiments, I/O interface 830 may perform any necessary protocol, timing, or other data transformations to convert data signals from one component (e.g., system memory 88) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. Also, in some embodiments some or all of the functionality of I/O interface 830, such as an interface to system memory 88, may be incorporated directly into processor 810.

Network interface 840 may be configured to allow data to be exchanged between computing device 800 and other device or devices 880 attached to a network or network(s) 850, such as other computer systems or devices as illustrated in FIGS. 1 through 4, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 88 may be one embodiment of a computer-accessible medium configured to store program instructions and data as described above for FIGS. 1-6 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 88 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A system configured to communicatively couple to an optical communications network comprising a plurality of optical data links comprising a plurality of data channels, the system comprising:
   one or more processors; and
   a memory in communication with the one or more processors, the memory having computer-readable instructions stored thereupon that, when executed by the one or more processors, cause the system to perform operations comprising:
   obtaining a time-domain sampled waveform of a selected data channel;
   applying a Fourier transform to the time-domain sampled waveform of the selected data channel to generate a frequency-domain waveform of the selected data channel;
   obtaining time-domain sampled waveforms of neighboring data channels of the selected data channel;
   applying a Fourier transform to the time-domain sampled waveforms of the neighboring data channels of the selected data channel to generate frequency-domain waveforms of the neighboring data channels of the selected data channel;
   calculating a noise-to-signal ratio based on the frequency-domain waveforms of the selected data channel and the neighboring data channels of the selected data channel;
   based on the calculated noise-to-signal ratio, estimating an optical signal to noise ratio (OSNR) penalty; and
   generating a notification of a potential cross-talk issue when the OSNR penalty exceeds a predetermined threshold.

2. The system of claim 1, wherein homodyne detection is configured to set up a same wavelength for a transmitter and receiver for the selected channel.

3. The system of claim 1, wherein the time-domain sampled waveforms are generated after analog-to-digital (ADC) sampling of optical signals in the optical communications network.

4. The system of claim 1, wherein the OSNR penalty is determined based on a scale factor k that is calculated based on a crosstalk waveform equation.

5. The system of claim 1, wherein the OSNR penalty is determined based on a weighted crosstalk value that is determined by multiplying an interfering signal by a power spectral density of a primary signal.

6. The system of claim 1, wherein the OSNR penalty is determined at a pre-forward error correction (pre-FEC) bit error rate (BER) threshold.

7. The system of claim 6, wherein the pre-FEC BER threshold is 1.25E-2.

8. An optical communications network comprising:
   a plurality of optical data links comprising a plurality of data channels; and
   a system configured to:
   turn off neighboring data channels of a target data channel;
   obtain a time-domain sampled waveform for the target data channel, wherein the time-domain sampled waveform is generated after analog-to-digital conversion;
   apply a Fourier transform to the time-domain sampled waveform for the target data channel to generate a frequency-domain waveform for the target data channel;
   turn off the target data channel and turn on neighboring data channels of the target data channel;
   obtain time-domain sampled waveforms for the neighboring data channels of the target data channel;
   apply a Fourier transform to the time-domain sampled waveforms for the neighboring data channels of the target data channel to generate frequency-domain waveforms for the neighboring data channels of the target data channel;
   calculate a noise-to-signal ratio based on the frequency-domain waveforms of the target data channel and the neighboring data channels;
   based on the calculated noise-to-signal ratio, estimate an OSNR penalty; and
   generate a notification when the OSNR penalty exceeds a predetermined threshold.

9. The optical communications network of claim 8, wherein the system is further configured to:
   determine a weighted crosstalk based on a waveform overlap integral between a crosstalk waveform and the target channel waveform and scaled with a k factor; and
   determining that the OSNR penalty exceeds the predetermined threshold based on the weighted crosstalk.

10. The optical communications network of claim 8, wherein the time-domain sampled waveforms are generated after analog-to-digital (ADC) sampling of optical signals in the optical communications network.

11. The optical communications network of claim 8, wherein the OSNR penalty is determined based on a scale factor k that is calculated based on a crosstalk waveform equation.

12. The optical communications network of claim 8, wherein the OSNR penalty is determined based on a weighted crosstalk value that is determined by multiplying an interfering signal by a power spectral density of a primary signal.

13. The optical communications network of claim 8, wherein the OSNR penalty is determined at a pre-forward error correction (pre-FEC) bit error rate (BER) threshold.

14. The optical communications network of claim 13, wherein the BER threshold is 1.25E-2.

15. A method implemented on an optical communications network comprising a plurality of optical data links comprising a plurality of data channels, the method comprising:
    receiving a time-domain sampled waveform of a selected data channel;
    applying a Fourier transform to the time-domain sampled waveform of the selected data channel to generate a frequency-domain waveform of the selected data channel;
    receiving time-domain sampled waveforms of neighboring data channels of the selected data channel;
    applying a Fourier transform to the time-domain sampled waveforms of the neighboring data channels to generate frequency-domain waveforms of the neighboring data channels;
    calculating a noise-to-signal ratio based on the frequency-domain waveforms of the selected data channel and the neighboring data channels;
    based on the calculated noise-to-signal ratio, estimating an optical signal to noise ratio (OSNR) penalty; and
    generating a notification indicative of a cross-talk issue when the OSNR penalty exceeds a predetermined threshold.

16. The method of claim 15, further comprising:
    turning off neighboring data channels of the selected data channel when accessing the time-domain sampled waveform for the selected data channel; and
    turning off the selected data channel and turn on the neighboring data channels when accessing the time-domain sampled waveforms for the neighboring data channels.

17. The method of claim 15, wherein the OSNR penalty is determined based on a scale factor k that is calculated based on a crosstalk waveform equation.

18. The method of claim 17, wherein the OSNR penalty is determined based on a weighted crosstalk value that is determined by multiplying an interfering signal by a power spectral density of a primary signal.

19. The method of claim 15, further comprising wherein the OSNR penalty is determined at a pre-forward error correction (pre-FEC) bit error rate (BER) threshold.

20. The method of claim 15, wherein homodyne detection is configured to set up a same wavelength for a transmitter and receiver for the selected channel.

* * * * *